United States Patent [19]

Fukuzaki

[11] Patent Number: 5,691,748
[45] Date of Patent: Nov. 25, 1997

[54] COMPUTER SYSTEM HAVING MULTI-DEVICE INPUT SYSTEM

[75] Inventor: Yasuhiro Fukuzaki, Saitama-ken, Japan

[73] Assignee: Wacom Co., Ltd, Saitama, Japan

[21] Appl. No.: 415,061

[22] Filed: Mar. 31, 1995

[30] Foreign Application Priority Data

Apr. 2, 1994 [JP] Japan ..................... 6-87421

[51] Int. Cl.[6] .................................. G08C 21/00
[52] U.S. Cl. ............................... 345/173; 345/179
[58] Field of Search ................... 345/157, 173, 345/175, 179; 395/155; 178/18

[56] References Cited

U.S. PATENT DOCUMENTS

| | | | |
|---|---|---|---|
| 4,686,332 | 8/1987 | Greanias et al. | 345/173 |
| 4,933,514 | 6/1990 | Bowers | 178/18 |
| 5,177,328 | 1/1993 | Ito et al. | 345/173 |
| 5,228,124 | 7/1993 | Kaga et al. | 395/161 |
| 5,349,139 | 9/1994 | Verrier et al. | 178/19 |
| 5,518,078 | 5/1996 | Tsujioka et al. | 178/18 |

FOREIGN PATENT DOCUMENTS

| | | |
|---|---|---|
| 63-106033 | 5/1988 | Japan . |
| 63-108424 | 5/1988 | Japan . |
| 3-147012 | 6/1991 | Japan . |
| 0458053 | 9/1992 | Japan . |

Primary Examiner—Wendy Garber
Attorney, Agent, or Firm—Lowe, Price, LeBlanc & Becker

[57] ABSTRACT

A computer system including a multi-device input system has a screen operation mode and a menu display item selection mode, to eliminate mode switching and achieve better operability. The computer system has: a display unit; a computer incorporating a regular processor and a menu selector; and a coordinate detector having a coordinate detection area superimposed with a menu display. The coordinate detector simultaneously detects coordinate information of two position pointing devices and supplies the coordinate information to the computer; a first position pointing device is exclusively used for selecting menu items from the menu display. A device for identifying position pointing devices detects the type of position pointing device being used on the coordinate detector. In response to the identifying device determining that the first position pointing device is used, the coordinate information about the first device is supplied to the menu selector and a symbol corresponding to the selected menu item is displayed. In response to the identifying device determining that a second position pointing device is being used, coordinate information about the second device is supplied to the regular processor so movement of the second device results in lines being drawn on the display.

10 Claims, 4 Drawing Sheets

FIG. 3

|    | D7 | D6  | D5 | D4  | D3 | D2 | D1  | D0  |
|----|----|-----|----|-----|----|----|-----|-----|
| 1  | 1  | RDY | 1  | RES | F  | Xs | X15 | X14 |
| 2  | 0  | X13 | X12| X11 | X10| X9 | X8  | X7  |
| 3  | 0  | X6  | X5 | X4  | X3 | X2 | X1  | X0  |
| 4  | 0  | F3  | F2 | F1  | F0 | Ys | Y15 | Y14 |
| 5  | 0  | Y13 | Y12| Y11 | Y10| Y9 | Y8  | Y7  |
| 6  | 0  | Y6  | Y5 | Y4  | Y3 | Y2 | Y1  | Y0  |
| 7  | 0  | As  | A5 | A4  | A3 | A2 | A1  | A0  |
| 8  | 1  | RDY | 0  | RES | F  | Xs | X15 | X14 |
| 9  | 0  | X13 | X12| X11 | X10| X9 | X8  | X7  |
| 10 | 0  | X6  | X5 | X4  | X3 | X2 | X1  | X0  |
| 11 | 0  | F3  | F2 | F1  | F0 | Ys | Y15 | Y14 |
| 12 | 0  | Y13 | Y12| Y11 | Y10| Y9 | Y8  | Y7  |
| 13 | 0  | Y6  | Y5 | Y4  | Y3 | Y2 | Y1  | Y0  |
| 14 | 0  | As  | A5 | A4  | A3 | A2 | A1  | A0  |

FIG. 4

| ADDRESS | DATA |
|---|---|
| n | X-COORDINATE HIGH ORDER BYTE OF POSITION POINTING DEVICE 18 |
| n + 1 | X-COORDINATE LOW ORDER BYTE OF POSITION POINTING DEVICE 18 |
| n + 2 | Y-COORDINATE HIGH ORDER BYTE OF POSITION POINTING DEVICE 18 |
| n + 3 | Y-COORDINATE LOW ORDER BYTE OF POSITION POINTING DEVICE 18 |
| n + 4 | SWITCH INFORMATION ON POSITION POINTING DEVICE 18 |
| n + 5 | PEN PRESSURE INFORMATION ON POSITION POINTING DEVICE 18 |
| n + 6 | DETECTION STATUS OF POSITION POINTING DEVICE 18 |
| n + 7 | X-COORDINATE HIGH ORDER BYTE OF POSITION POINTING DEVICE 19 |
| n + 8 | X-COORDINATE LOW ORDER BYTE OF POSITION POINTING DEVICE 19 |
| n + 9 | Y-COORDINATE HIGH ORDER BYTE OF POSITION POINTING DEVICE 19 |
| n + 10 | Y-COORDINATE LOW ORDER BYTE OF POSITION POINTING DEVICE 19 |
| n + 11 | SWITCH INFORMATION ON POSITION POINTING DEVICE 19 |
| n + 12 | PEN PRESSURE INFORMATION ON POSITION POINTING DEVICE 19 |
| n + 13 | DETECTION STATUS OF POSITION POINTING DEVICE 19 |

COMPUTER SYSTEM HAVING MULTI-DEVICE INPUT SYSTEM

BACKGROUND OF THE INVENTION

1. Field of the Invention

The present invention relates to a computer system equipped with a multi-device input system which is capable of simultaneously entering positional information by using a plurality of position pointing devices.

2. Description of the Related Art

A computer aided design (CAD) system is known as an apparatus for designing electrical circuits, machines, etc. by employing a computer. In the CAD system, a drawing area is set on the display screen of a display unit and an electrical circuit or other object to be designed is drawn in the drawing area. A designer selects a symbol denoting a particular component of the electrical circuit or other object and enters the selected symbol in the computer to have it displayed in a required position on the display screen. Thus, the designer proceeds with the design of the electrical circuit by connecting many symbols denoting circuit elements on the display screen while deliberating the structure of the intended electrical circuit.

In such a CAD system, when selecting the symbols indicating the elements of an electrical circuit, machine, etc., a menu sheet called "symbol sheet" showing many different symbols has been used to input to a computer the information on the symbols denoting the elements of an electrical circuit or others. When this menu sheet is used, it is placed in a coordinate detectable area of a coordinate detecting device. A designer operates a single position pointing device to select one of the number of symbols shown on the menu sheet placed on the coordinate detection surface of the coordinate detecting device; the coordinate data specified by the position pointing device is detected by the coordinate detecting device and supplied to the computer. In this way, many different symbols are entered in the computer in drawing on the display screen for designing an electrical circuit or machine.

The conventional CAD system has two operation modes: in one mode, the operator specifies the operation to be carried out on an object shown on the display screen; in the other mode, the operator selects required symbols from the menu sheet placed on the coordinate detecting device and enters them in the computer. The mode wherein the operation to be carried out on the object shown on the display screen means a mode wherein the entered symbols are laid out in the required positions and various operation items for drawing shown on the display screen are appointed in order to draw a graphic shown on the display screen.

In the conventional CAD system, an operator has to switch between the two operation modes by, for example, specifying one of the menu items given in the screen menu by using a single position pointing device, causing inconvenience to the operator. The same inconvenience applies to other similar computer systems which have two operation modes, namely, a screen operation mode and a menu display item selection mode.

SUMMARY OF THE INVENTION

Accordingly, an object of the present invention is to provide a computer system having a screen operation mode and a menu display item selection mode, which eliminates the need of mode switching operation by employing a multi-device input system capable of simultaneously detecting the instructions issued by at least two position pointing devices at the same time, thereby achieving better operability.

It is assumed that the computer system in accordance with the present invention is equipped with a display unit, and a computer which incorporates a regular processing means for implementing regular processing and a menu selecting means for selecting a menu with respect to a display content on the display screen of the display unit. The computer system further includes a coordinate detecting device which has a coordinate detectable area provided with a menu displaying means with a plurality of menu items displayed, simultaneously detects the coordinate information supplied through at least two position pointing devices which are operated on the coordinate detectable area, and outputs the coordinate information to the computer; at least one position pointing device exclusively used for selecting menu items which is operated on the menu item display surface of a menu displaying means; and a position pointing device identifying means for identifying the type of position pointing device. In such a configuration, if the position pointing device identifying means determines that the position pointing device operated in the coordinate detectable area is the position pointing device exclusively used for selecting menu items, then it sends the coordinate information supplied from the coordinate detecting device to the menu selecting means. If the position pointing device identifying means determines that the position pointing device operated in the coordinate detectable area is other position pointing device than the position pointing device exclusively used for selecting menu items, then it sends the coordinate information received from the coordinate detecting device to the regular processing means.

In the aforesaid configuration, the drawing processing for designing an electrical circuit or machine is taken as an example of the processing carried out on the display items on the display screen, and the computer system described above is a CAD system.

In the aforesaid configuration, preferably, the menu displaying means is a menu sheet placed on the coordinate detectable area, a display unit provided with the coordinate detectable area, a printed matter printed in the coordinate detectable area, or the like.

According to the present invention, in a computer system such as a CAD system provided with, as an input system, a coordinate input device capable of simultaneously detecting positional information entered at the same time by a plurality of position pointing devices; at least one of the plurality of position pointing devices is assigned exclusively to menu item selection and when coordinate information is entered through the position pointing device exclusively assigned to menu item selection is entered, this input is identified and the entered coordinate information is supplied to the means which carries out menu selection; and when coordinate information is entered through any other position pointing device, the entered coordinate information is supplied to the means which carries out regular processing. The configuration and operation described above relieves an operator from the need of laboriously switching between two operation modes by using a position pointing device, thus achieving simpler operation in a computer system which is capable of drawing or performing other processing for designing and which has two operation modes, namely, the operation mode for carrying out the processing related to the display contents on the display screen, and the operation mode for selecting and entering menu items of the menu display.

BRIEF DESCRIPTION OF THE DRAWINGS

FIG. 3 is a diagram of an exemplary data format of the coordinate data output from the coordinate detecting device; and FIG. 4 is a diagram of the storage format of coordinate data stored in the computer.

DESCRIPTION OF THE PREFERRED EMBODIMENTS

An embodiment of the present invention will now be described in conjunction with the accompanying drawings. In the embodiment, the description is given to a CAD system as an example of the computer system which employs, as the input system thereof, a coordinate input device equipped with the multi-device function.

Figure 1:
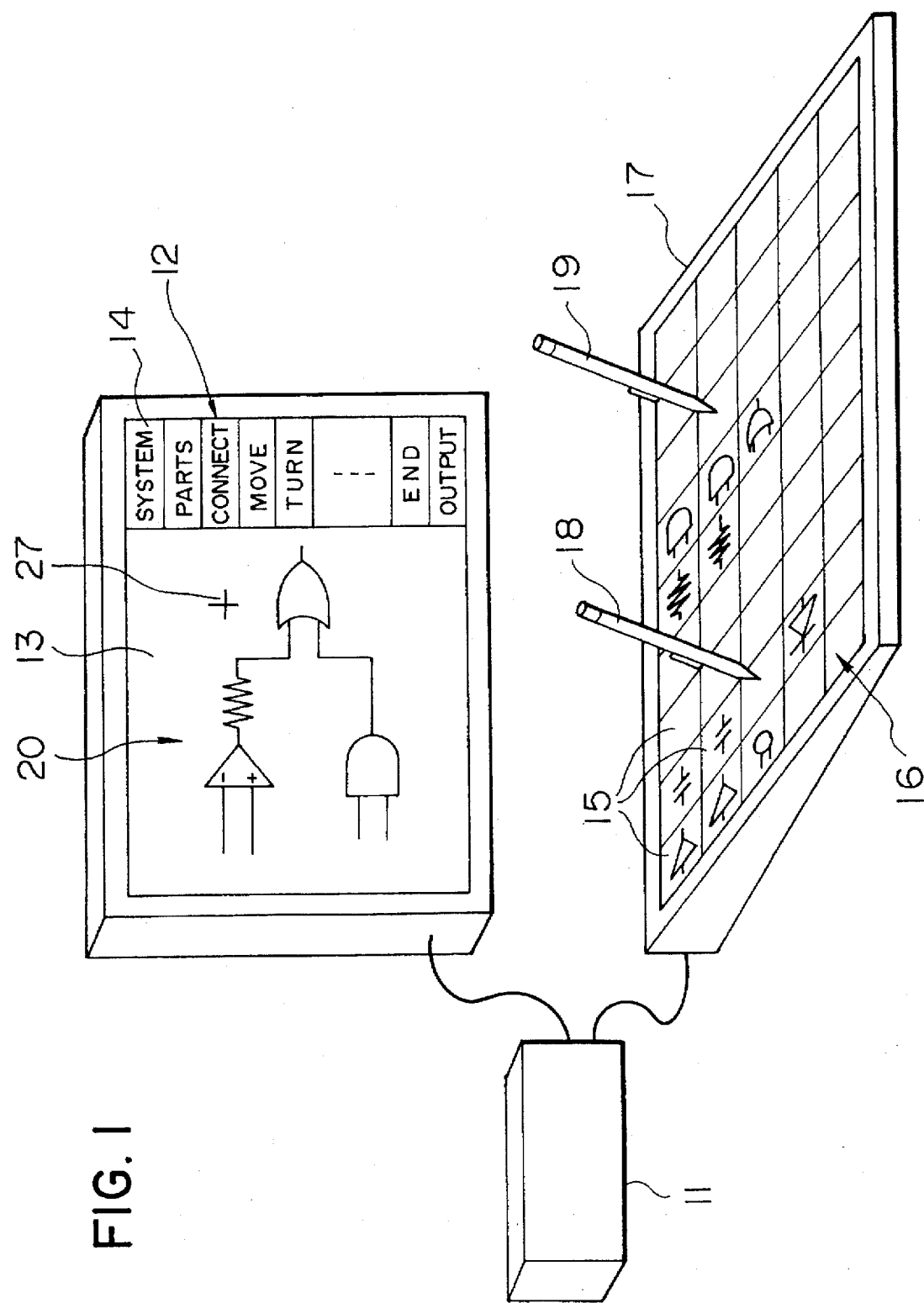
FIG. 1 is a diagram showing the configuration of a CAD system to which the present invention applies.

In FIG. 1, the computer system for implementing the CAD system is constituted by a memory (not shown) for storing an application program related to the CAD system, a computer 11 including a CPU for executing the application program, a display unit 12 having a screen including a drawing area 13 for displaying designs which have been created by an operator of the computer system and a necessary screen menu area 14, a menu sheet 16 carrying a plurality of symbols 15 which denote components required for creating a graphic in the drawing area 13, and a coordinate detecting device (generally called "digitizer") 17 which has a coordinate detectable area (sensor table) on which the menu sheet 16 is placed and which functions as a positional information input means. The coordinate detecting device 17 in this embodiment has the multi-device function.

The coordinate detecting device 17 including the multi-device function has a hardware configuration and data structure which enable the following: when, for example, two pen-type position pointing devices are operated on a sensor table of a sensing unit of the coordinate detecting device and positional information (coordinate data) is entered through the two position pointing devices, the positional information given through the position pointing devices is detected and output at the same time. Hence, an operator can perform input operation with two position pointing devices, 18 and 19, held in both hands on the sensor table of the coordinate detecting device 17. The coordinate data entered through the two position pointing devices 18, 19 are sent from the coordinate detecting device 17 to the computer 11. A prior art coordinate detecting device equipped with a multi-device function is disclosed by applicant in Japanese Patent Laid-Open No. 3-147012, Japanese Patent Application No. 63-106033, Japanese Patent Application No. 63-108424, etc.

The CAD system described above is intended for designing an electrical circuit as an example; the menu sheet 16 resting on the coordinate detecting device 17 carries diverse symbols 15 denoting the electrical circuit elements required for drawing the electrical circuit, the symbols being given in the squares of a table. Each of the symbols constitutes a menu item to be selected through the position pointing device. The menu sheet 16 is made of paper, for example. On the other hand, the drawing area 13 of the screen of the display unit 12, such as a CRT, displays an electrical circuit 20 which is being designed, while the screen menu area 14 displays the menu items which are selected to specify required operations for creating the graphic in the process of design displayed in the drawing area 13.

The aforesaid CAD system performs two types of processing: one is the processing called "menu selection processing" wherein one of the menu items (symbols) on the menu sheet 16 placed on the coordinate detecting device 17 is selected and entered in the computer 11 and the selected menu item is shown on the display screen; and the other is called "regular processing" wherein various processing is carried out for creating the electrical circuit 20 displayed in the drawing area 13. Coordinate detecting device 17 detects the position of two position pointing devices 18 and 19, respectively used exclusively for menu selection processing and exclusively for regular processing. The coordinate detecting device 17 having the multi-device function is capable of identifying the two position pointing devices 18, 19 in accordance with the data entered through the respective position pointing devices; therefore, the computer 11 uses the coordinate data, which have been entered through the position pointing device 18, for the menu selection processing, while it uses the coordinate data, which have been entered through the position pointing device 19, for the regular processing. This configuration for performing the processing is described in detail with reference to FIG. 2.

Figure 2:
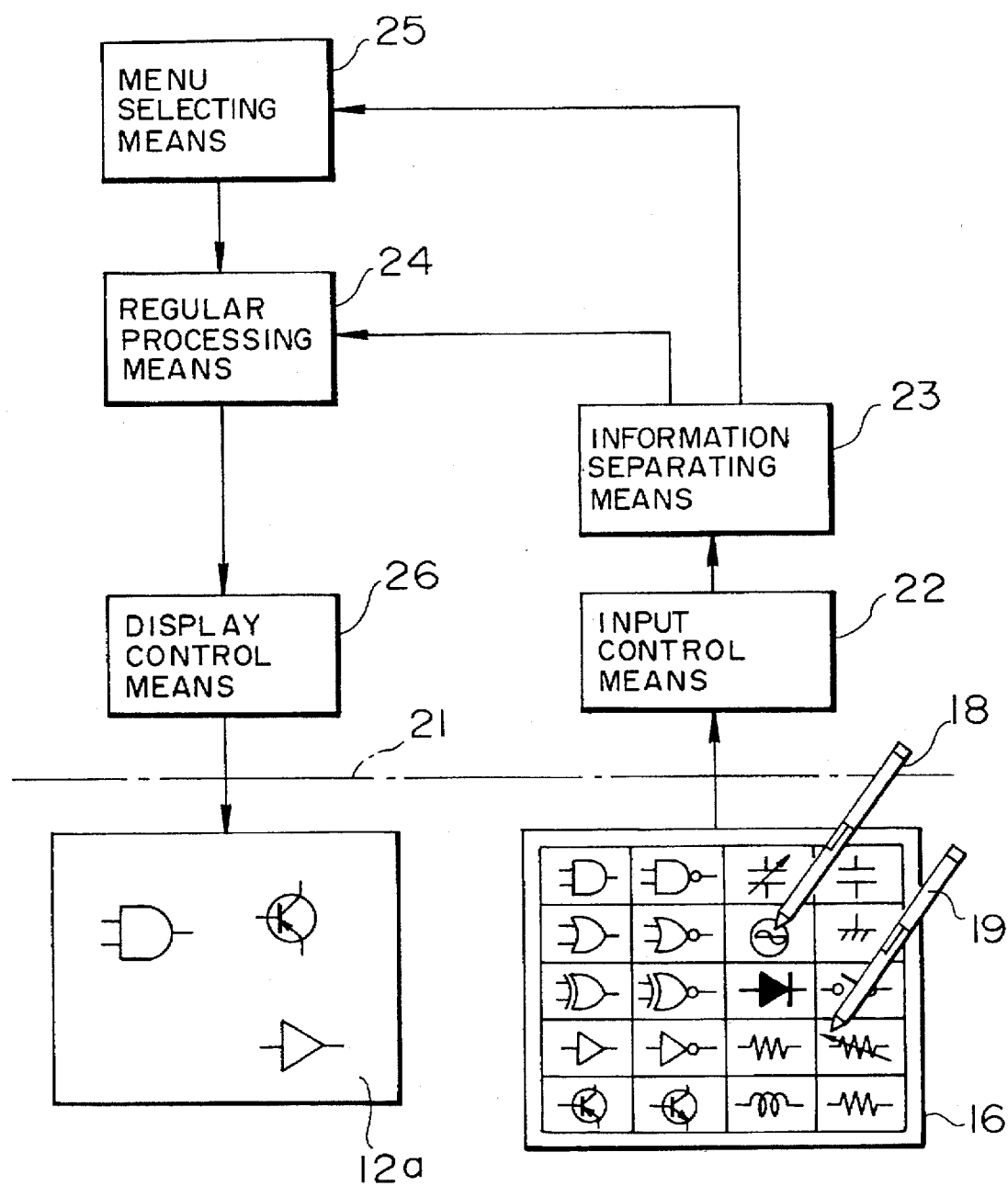
FIG. 2 is a block diagram showing the internal configuration of a computer.

FIG. 2, a more detailed diagram of the system configuration shown in FIG. 1, includes the functional means incorporated in the computer 11. Numeral 16 denotes the menu sheet resting on an effective area, i.e., the coordinate detectable area, of the coordinate detecting device 17; only a part of menu sheet 16 is shown in FIG. 2. Two position pointing devices 18 and 19 are operated at the same time on the menu sheet 16; position pointing device 18 is dedicated to the menu selection processing, and position pointing device 19 is dedicated to the regular processing. Display unit 12 includes display screen 12a. In FIG. 2, the means shown above dotted line 21 are the various functions which are incorporated in the computer 11 and which are implemented by a program.

Input controller 22 responds to coordinate data supplied from the coordinate detecting device 17 (discussed later) and controls the entered data in accordance with the data structure of the coordinate data. Information separating means 23, which characterizes the present invention, determines whether the coordinate data read from the input controller 22 is the coordinate data entered through position pointing device 18 or position pointing device 19 (the function is implemented by a position pointing device identifying device). Separating means 23 also supplies regular coordinate data derived from position pointing device 19 to the regular processor 24 for regular processing only, while supplying menu coordinate data derived from position pointing device 18 to the menu selector 25 for menu processing only. This function is implemented by a coordinate data separating means or signal sending changeover means.

The regular processor 24 and the menu selector 25 provide the functions that are available also with the conventional system. The regular processor 24 carries out general drawing operations in the CAD system by using the position pointing device 19 and the screen menu processing by using the screen menu area 14. When a menu item is selected from the menu sheet 16 through the position pointing device 18, the menu selector 25 reads the data related to the symbol which corresponds to the position (coordinate data) specified by the position pointing device 18 and causes the display screen 12a to display the data. The output signal directly received from the regular processor 24 and the output signal received from the menu selector 25 via the regular processor 24 are shown on the display screen 12a via a display controller 26.

More detailed description is now given to the aforesaid input controller 22 and the information separating device 23.

In connection to these means, the structure of the coordinate data sent from the coordinate detecting device 17 to the computer 11 and the structure of the data in the computer 11 are also described in detail.

FIG. 3 is an exemplary data format chart of the coordinate data supplied from the coordinate detecting device 17 to the computer 11. The data format of FIG. 3 applies to the RS232C interface and it is the data format set for the multiple mode compatible with the aforesaid multi-device function. The coordinate data consists of 14 bytes, each byte consisting of 7 bits; the coordinate data are transferred 1 byte at a time as serial data from the coordinate detecting device 17 to the computer 11. In the data structure shown in FIG. 3, bytes 1 through 7 represent the data related to the menu position pointing device 18 and bytes 8 through 14 represent the data related to the drawing position pointing device 19. The computer 11 determines whether received coordinate data belong to the position pointing device 18 or 19 by checking whether the bit following RDY is "1" or "0". In FIG. 3, RDY is set to "1" when a position pointing device indicates a point within the effective reading range. Symbol RES denotes a reserve bit, F a flag common to all switches (set to 1 if any of the switches is depressed), F0 through F3 binary data indicating the No. of a particular switch which is being depressed, Xs and Ys the sign bits of a coordinate value, X0 through X15 X-coordinate binary data, Y0 through Y15 Y-coordinate binary data. As the sign bit of pen pressure information, and A0 through A5 the binary data of pen pressure information.

When coordinate data in the data format shown in FIG. 3 are sent one byte at a time to the computer 11, the input controller 22 stores the received data in the original format until a complete set comprising 14 bytes is received. When the complete set of 14 bytes has been received, then the input control means 22 converts the received data into the format shown in FIG. 4 before storing them in the memory.

The two position pointing devices 18, 19 are operated on the menu sheet 16 which rests on the effective area of the coordinate detecting device 17. In the operations including the menu selection through the position pointing devices, when the switches of the respective position pointing devices are pressed, the selected contents are identified based on the coordinate data which correspond to the positions wherein the switches were pressed. Only in the case of the position pointing device 19 dedicated to regular processing, a pointer 27 is displayed as illustrated in FIG. 1. If the position pointing device 19 is moved without the switch thereof depressed, then the pointer 27 merely moves on the display screen, following the movement of the position pointing device 19.

The position pointing device identifying means provided in the aforesaid information separating means 23 determines which position pointing device has its switch depressed, in accordance with the data shown in FIG. 4. If the information separating means 23 determines that the switch of the position pointing device 18 exclusively used for menu selection processing has been depressed, then it sends the coordinate information on the position pointing device 18 to the process of the menu selection processing (process carried out by the menu selecting means 25). In other words, the information separating means 23 hands the positional information on the position pointing device 18 over to the menu selecting program (subroutine) to execute the program. If the information separating means 23 determines that the switch of the position pointing device 19 exclusively used for regular processing has been depressed, then it sends the coordinate information on the position pointing device 19 to the process of the regular processing corresponding to the specified position on the display screen (process carried out by the regular processing means 24). In other words, the information separating means 23 hands the positional information on the position pointing device 19 over to the regular processing program (subroutine) to execute the program.

Thus, the information separating means 23 is configured so as to receive the positional information on the respective position pointing devices 18 and 19 in a complete form and to sort the positional information before subjecting it to the process of menu selection processing or the process of regular processing. Actual processing, however, is performed on an assumption that the switches of the position pointing devices are pressed.

In the embodiment described above, the menu sheet 16 was used as the means for selecting the menu items such as symbols (the menu displaying means displaying the menu items); however, the menu displaying means is not limited thereto. Alternatively, for example, the input table itself which is the coordinate detectable area of the coordinate detecting device 17 can be designed to serve as a display unit using an LCD or the like (e.g., display unit made integral with I/O display), enabling the menu items to be displayed on the screen of the display unit. Further alternatively, the menu items may be directly printed on the surface of the input table of the coordinate detecting device 17.

In the embodiment described above, the present invention was applied to a CAD system; however, the present invention is of course applicable to other similar computer systems.

As it is obvious from the above description, according to the present invention, there is provided a computer system such as a CAD system which has the screen operation mode and the menu display item selection mode so as to implement the process for carrying out regular drawing processing and the process for carrying out the menu selection processing for drawing with respect to a display content on the screen. The computer system is further equipped with a coordinate input device having a multi-device function as the input means. One position pointing device thereof is assigned exclusively to the selection of menu display items. Thus, the need for switching between two operating modes is eliminated, leading to dramatically improved operability.

What is claimed is:

1. A computer system having a multi-device input system, said computer system comprising:

a display unit;

a computer including a regular processor for carrying out regular processing and a menu selector for carrying out menu selection processing with respect to display contents on a display screen of said display unit;

a coordinate detecting device having a coordinate detectable area, the coordinate detecting device including a menu display area for displaying a plurality of menu items, the coordinate detecting device being capable of displaying the menu items simultaneously with detecting coordinate information of at least two position pointing devices operated on said coordinate detectable area, the coordinate detecting device responding to the position pointing devices to supply coordinate information about the position pointing devices to said computer;

at least one, but not all, of said position pointing devices being exclusively used for selecting menu items from the menu item display area; and a position pointing device identifier for identifying the type of said position pointing device;

the coordinate information derived from said coordinate detecting device being sent to said menu selector in response to said position pointing device identifier determining that the position pointing device operated in said coordinate detectable area is a position pointing device exclusively used for menu item selection, the coordinate information derived from said coordinate detecting device being sent to said regular processor in response to said position pointing device identifier determining that it is a position pointing device other than the position pointing device used exclusively for menu selection.

2. A computer system including the multi-device input system according to claim 1, wherein said menu area includes a menu sheet resting on said coordinate detectable area.

3. A computer system including the multi-device input system according to claim 1, wherein said menu area includes a display unit having said coordinate detectable area.

4. A computer system including the multi-device input system according to claim 1, wherein said menu display area includes printed matter printed on said coordinate detectable area.

5. The computer system of claim 1 wherein the coordinate detecting device is arranged so portions thereof responsive to the at least one position pointing device used exclusively for menu selection is also responsive to the at least one position device other than the position pointing device used exclusively for menu selection.

6. A method of performing computer assisted design operations with a coordinate detector superimposed with a menu containing plural symbols, the coordinate detector being coupled with a display via a computer, comprising the steps of simultaneously grasping with first and second hands first and second position pointing devices so the first and second pointing devices are proximate the coordinate detector, coupling energy between the first and second pointing devices and the coordinate detector so signals indicative of the identities and positions of the first and second pointing devices are supplied to the computer, the computer responding to the identity and positions of the first pointing device to activate the display so the display displays symbols corresponding to symbols pointed to by the first pointing device, the computer responding to the signals indicative of the identity and positions of the second pointing device to activate the display so the display displays lines corresponding to locations pointed to by the second pointing device on the coordinate detector.

7. The method of claim 6 further including moving the first pointing device relative to the coordinate detector so signals indicative of the first pointing device position are supplied to the computer, the computer responding to the movement of the first pointing deice so the symbol corresponding to the symbol on the menu pointed to by the first pointing device immediately prior to movement of the first pointing device is moved to locations on the display corresponding to locations on the detector where the first pointing device is moved.

8. The method of claim 7 wherein both of the first and second position pointing devices include switches, activating the switches of the first and second position pointing devices with digits of the first and second hands respectively to cause (a) movement of the symbol on the display while a switch on the first of the position pointing devices is activated and while the first position pointing device is being moved relative to the coordinate detector by the first hand, and (b) drawing a line on the display while a switch on the second of the position pointing devices is activated and while the second position pointing device is being moved relative to the coordinate detector by the second hand.

9. The method of claim 6 wherein the first and second hands move the first and second devices to the same portions of the coordinate detector so the computer is supplied with signals indicative of the first and second devices being at the same locations.

10. A method of performing computer aided design operations with a coordinate detector superimposed with a menu containing plural symbols, the coordinate detector being coupled with a display via a computer, comprising the steps of supplying energy to first and second areas of the position detector under the respective control of first and second hands of an operator so signals indicative of the identity of the control by the first and second hands and positions of the areas pointed to under the control of the first and second hands are supplied to the computer, the computer responding to the identity of the control provided by the first hand and the positions of the first area to activate the display so the display displays symbols corresponding to symbols pointed to under the control of the first hand, the computer responding to the identity of the control provided by the second hand and the positions of the second area to activate the display so the display displays lines corresponding to lines drawn under the control of the second hand.

* * * * *